March 30, 1926. 1,578,687
F. W. SPERR, JR
PROCESS FOR THE REMOVAL OF NAPHTHALENE AND ANALOGOUS
HYDROCARBONS FROM FUEL GASES
Filed Jan. 26, 1925
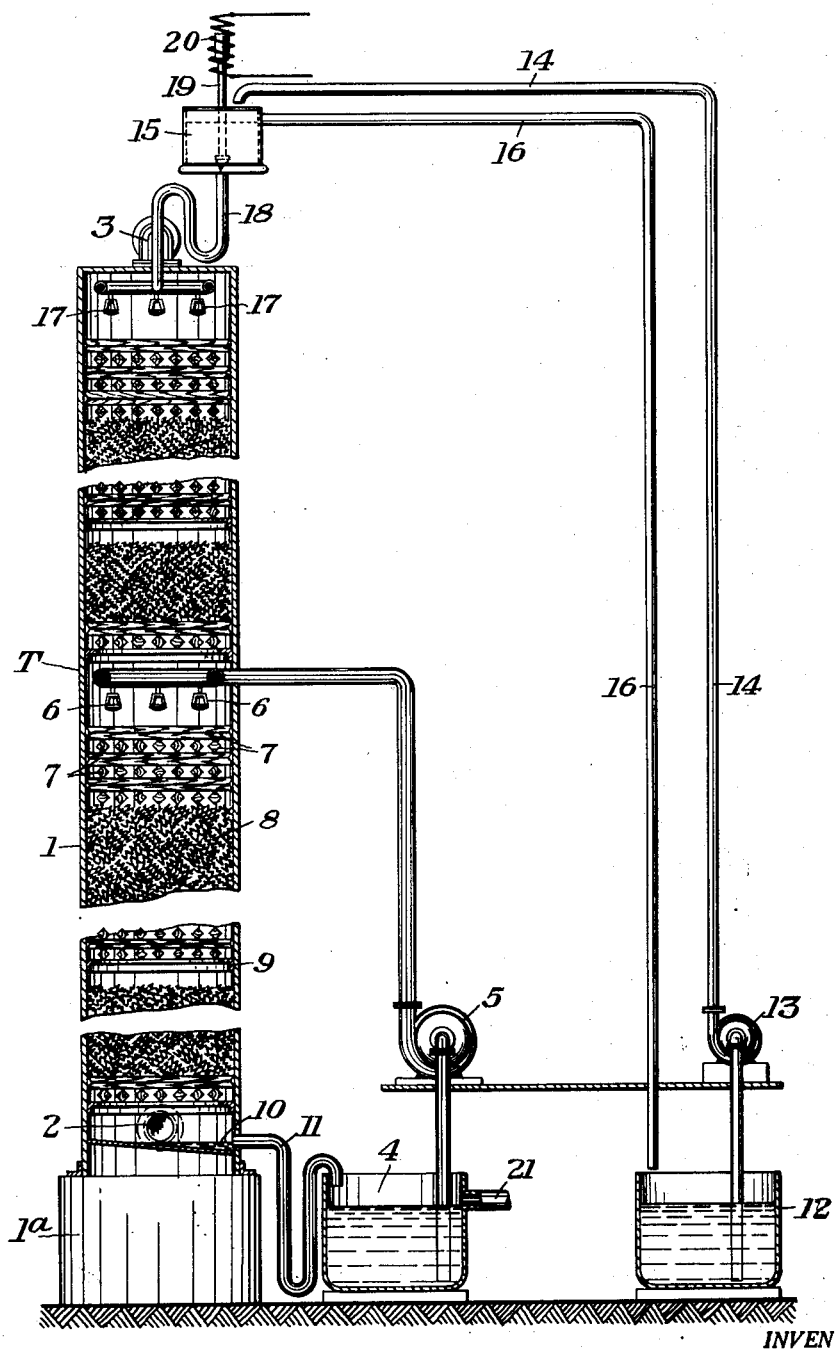
INVENTOR.
Frederick W. Sperr, Jr.
by his attys
Byrnes, Stebbins & Parmelee, Patented Mar. 30, 1926.

1,578,687

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

PROCESS FOR THE REMOVAL OF NAPHTHALENE AND ANALOGOUS HYDROCARBONS FROM FUEL GASES.

Application filed January 26, 1925. Serial No. 4,686.

*To all whom it may concern:*

Be it known that I, FREDERICK W. SPERR, Jr., a citizen of the United States, residing at Pittsburgh, Allegheny County, Pennsylvania, have invented a new and useful Improvement in Processes for the Removal of Naphthalene and Analogous Hydrocarbons from Fuel Gases, of which the following is a full, clear, and exact description.

This invention relates to a process for the removal of naphthalene and analogous hydrocarbons from fuel gases, such as coal gas, water gas, coke oven gas and the like. The process is preferably carried out after the gas has been subjected to the usual treatment of cooling and condensation and the removal of tar and ammonia, and while it is hereinafter described as particularly applied to the removal of naphthalene, which is an important commercial application of the invention, the process is not limited to the removal of naphthalene, but is of general utility for the removal of other hydrocarbons such as are characterized by having a relatively small vapor tension and by being present in vapor form in gas at ordinary ranges of temperature in relatively small amounts and near their saturation limit. Anthracene is an example of such a hydrocarbon, the removal of which may be effected by the present invention.

Naphthalene is formed in connection with the production of most types of fuel or illuminating gas. It is a solid at ordinary temperatures and pressures and has a melting point of approximately 80° C. However, it exists in a state of vapor diffused through the gas at temperatures far below its melting point and at each temperature has a definite saturation limit. For example, 100 cu. ft. of dry gas saturated with naphthalene at 25° C. contains 25.2 grains of naphthalene. At 20° C. the same volume contains 15.5 grains and at 15° C. the saturation limit is 9.4 grains of naphthalene. When gas saturated with naphthalene at any temperature below its melting point is cooled, the vapor passes directly into the solid state and takes the form of very light flaky flat crystals. These crystals occupy a large volume in proportion to their weight and are extremely troublesome to the gas manufacturer and to the consumer. While the actual weight of the solid crystals is very small, they occupy so large a space as to frequently obstruct the distributing mains and service apparatus.

The naphthalene which is in crystal form will pass from the solid state directly into a vapor as soon as it is slightly warmed or brought into contact with a gas carrying less naphthalene than the saturation limit. Consequently naphthalene which has been deposited in the mains in quantities too small to cause trouble may again evaporate and pass off with further amounts of gas when this reaches the deposit in a saturated condition. The same naphthalene may be re-deposited further along in the system after the gas becomes sufficiently cool, and serious local stoppages may thus occur in a system which as a whole contains very little naphthalene.

Naphthalene troubles have become more numerous and more acute in gas manufacture because the present practice tends toward the production of what is technically known as a dry gas, that is, a gas containing very small amounts of or being entirely deficient in readily condensible oils. In former practice the gas contained such a quantity of such oils that when condensation of the naphthalene occurred, these oils would also condense and prevent the naphthalene from going into the flaky naphthalene condition. In fact, the amount of oil so condensed would in most cases be sufficient to keep the naphthalene in solution so that it would eventually find its way to the drains or drips and be removed from the system. In the present practice, however, the gas rarely contains sufficient oils to prevent naphthalene stoppages and troubles may occur even when the gas leaving the works contains as little as 5 or 6 grains of naphthalene per 100 cu. ft.

It is therefore highly desirable to treat the gas at the point of manufacture in such a way that it will be practically free from naphthalene. A considerable quantity of naphthalene may be removed by thoroughly scrubbing the gas either in coolers wherein the gas is brought directly into contact with water or wherein the gas is indirectly cooled. The best that can be accomplished with these cooling processes, however, is to remove such amounts of naphthalene as occur beyond the saturation limit determined by the temperature imparted to the gas by the water. It is generally the situation then that the gas, after this cooling treatment, in most cases, contains sufficient naphthalene to cause trouble.

The methods which have so far been proposed for the removal of the small amounts of naphthalene that remain even after cooling the gas as much as possible have been based on the fact that naphthalene is soluble in such oils as anthracene oil, kerosene oil and various petroleum oils. Two principal difficulties have been encountered however. The first arises from the fact that very small amounts of naphthalene have to be dealt with and these small amounts are distributed through very large volumes of gas. There has accordingly been great difficulty in securing a distribution of oil through the large gas volume adequately to reach the naphthalene effectively without using excessive quantities of oil. Kerosene oil, for example, will readily take up 5 per cent of its weight in naphthalene. In some cases there may be only 10 to 15 grains of naphthalene per 100 cu. ft. of gas so that in such cases in a plant producing 1,000,000 cu ft. of gas per day from 40 to 60 gallons of oil per day should be sufficient for the removal of naphthalene. It should be noted that in some cases naphthalene may occur in amounts up to 50 or 75 grains per 100 cu. ft. in which case larger quantities of oil are required, but it is nevertheless of great importance to secure intimate contact between the still relatively small volume of oil and the large volume of gas being treated. In certain cases this has been attempted by the use of mechanical scrubbers, but these have the disadvantages of causing the gas to lose its pressure, of mechanical troubles and of heavy labor expense.

A second difficulty encountered in connection with the removal of naphthalene by oils is that if large amounts of the oil are used they absorb considerable amounts of benzols, thus lowering the heating value of the gas. In dealing with domestic gas in most cases the value of the benzols in the gas under normal conditions is greater than their value recovered from the oil.

I provide for scrubbing the gas in a plurality of stages and using successively purer solvent in the several stages. For example, in the last stage of operation, fresh solvent may be used and this solvent may be employed in an earlier scrubbing stage for gas which is supplied later in point of time. The major portion of the naphthalene present when the gas reaches the scrubbing apparatus is removed by the contaminated solvent, which solvent still has sufficient absorptive capacity to remove the major portion of the naphthalene. The gas as it reaches the later scrubbing stage or stages therefore contains only a relatively small quantity of naphthalene and this is removed by the pure solvent. The solvent is preferably introduced by distributing it over a permeable contact material which retains the solvent, distributes the same over an exceedingly large area and insures intimate contact therewith of all the gas.

I provide a contact material or filler for the scrubber consisting of steel turnings, which I have found are highly desirable for this purpose. These turnings are effective for causing an intimate contact of the gas and the solvent and masses of this contact material are preferably used in connection with distributing means which spread the solvent over the entire mass of steel turnings.

I also provide for re-circulating the major portion of the solvent or the solvent used in the earlier stages of scrubbing and for intermittently supplying the pure solvent to a contact mass such as above described. The apparatus may be conveniently embodied in a scrubbing tower which is supplied with banks of steel turnings alternating with banks of distributing means such as diamond hurdles which are made of wooden staves laid on edge. These staves support the several banks of steel turnings, prevent their being crushed together and also act as distributors which receive the solvent as it drips from the upper banks of turnings and spread the same uniformly throughout the tower so as to cause intimate contact of the gas and the solvent in the lower banks. In this tower the fresh solvent for the last stage of scrubbing may be supplied at the top of the tower and the solvent used in the earlier stages may be supplied at one or more points below the top of the tower. In such cases the fresh solvent passes downwardly and mixes with the solvent used in the earlier stage so that it is again used in an earlier scrubbing stage, while the last stage is always accomplished by fresh uncontaminated solvent.

My pending application Serial No. 84,640, filed January 29, 1926, is a division of this application, and therein I claim certain of the apparatus herein disclosed.

The accompanying drawing, which illustrates more or less diagrammatically a preferred embodiment of my invention, is a vertical section of a scrubbing tower and associated mechanism for carrying out the invention.

Referring to the drawing, there is shown a scrubbing tower indicated generally by T and consisting of a shell 1 mounted on a foundation 1ª. This shell is provided with a gas inlet pipe 2 at the bottom and a gas outlet pipe 3 at the top. The gas to be scrubbed is first subjected to operations wherein tar and ammonia have been removed and the gas has been subjected to the usual treatment of cooling and condensation. The gas reaches the tower through the opening 2 and passes upwardly to the opening 3 from which it is piped away. As the gas passes upwardly it comes in contact with a suitable naphthalene solvent such as one of the oils above referred to. This solvent is supplied from a tank 4 by a pump 5 which discharges the solvent through spray nozzles 6. The solvent falls toward the bottom of the tower and comes in contact with diamond hurdles 7, which act as distributors and insure uniform distribution of the solvent over the entire tower. These hurdles are made of wooden staves usually about one inch square laid in rows as shown in such manner that the lower corner edges of the staves in one layer rest on the upper corner edges of the staves in the adjusting lower layer. In making up the banks of diamond hurdles each bank may be constructed of some 5 to 10 layers, although when they are used merely as supports for the intermediate banks of steel turnings a smaller number of layers may be used.

The solvent is distributed by the diamond hurdles and falls on to a bank of steel turnings 8. These steel turnings are preferably in the form of spirals not exceeding one inch in diameter and not over approximately 12 inches long. It is desirable to limit the depth of each bank of steel turnings to approximately 4 or 5 feet, each bank being supported by a bank of diamond hurdles which in turn are carried upon supporting angles 9. In small towers the steel turnings may be depended on to support the diamond hurdles and other banks of turnings thereabove, but in large towers it is desirable as shown in the drawings to provide a suitable support 9 for each set of diamond hurdles.

The function of the steel turnings is to distribute the solvent over a very large surface and to bring it into intimate contact with the gas. The turnings offer a very high percentage of free space and an unusually low resistance to the passage of the gas, while at the same time they present an enormous surface. They further tend to break up and mix the streams of gas in such a way as to obtain a very high efficiency of contact. It would be possible to obtain excellent results with steel turnings alone but as above stated it is desirable to limit the depth of each bank, as it is found that unless this is done they will tend to pack too closely and offer increased resistance to the flow of gas. Other metal turnings may be employed if desired and material such as wood shavings or excelsior may be used in the tower in connection with certain features of my invention, but such materials as wooden shavings or excelsior are objectionable in that they tend to pack and offer greater resistance to the flow of gas.

The solvent moves downwardly through the diamond hurdles and the steel turnings until it reaches the bottom of the tower and is collected at 10 from where it passes through a pipe 11 having a trap therein and goes to the tank 4 for re-circulation.

The function of the apparatus just described is to reduce the naphthalene content to such a point that the remainder may be removed by small quantities of oil directly applied. The solvent may be kerosene oil, anthracene oil or the like. The re-circulation is conducted at such a rate as to attain even distribution over the entire cross sectional area of the tower. In practice this rate might be over 100 gallons per square foot cross sectional area per hour.

As the gas passes upwardly the naphthalene present is removed by the apparatus just described to such an extent that a final spray will remove the remainder so that when the gas passes the spray nozzles 6 it should not contain more than 15 to 30 grains of naphthalene per 100 cu. ft. depending on the amount of naphthalene originally contained in the gas. In fact, if the gas originally supplied to the apparatus contains naphthalene in quantities less than 15 grains per 100 cu. ft. the lower absorption stage may be done away with entirely and the last stage of absorption alone relied on to remove the naphthalene from the gas.

The upper portion of the tower is constructed just like the lower portion and consists of alternate banks of diamond hurdles and of steel turnings. It is necessary in this upper stage to bring the gas into contact with fresh solvent containing no naphthalene or only a very small amount thereof so that, for example, the vapor tension of such a solvent with respect to naphthalene will be less than the equivalent of 2 to 3 grains of naphthalene per 100 cu. ft. of gas. It is always preferable to employ a perfectly fresh solvent such as kerosene or gas oil which contains no naphthalene at all.

Since the amount of naphthalene to be removed in this stage of scrubbing is very small, the amount of oil required is also very small and the principal problem is to obtain an efficient distribution of this small quantity of oil over the tower filling so that it will come into uniform and intimate contact with a large quantity of gas. In order to accomplish this I make use of the principle of injecting oil at high rates for short periods of time and provide a permeable contact material such as the steel turnings above referred to for holding this solvent in the path of the gas. This principle of operation is described and claimed in the co-pending application of Eugene H. Bird, Serial No. 618,838, filed February 13, 1923.

The fresh solvent is supplied from a tank 12 by a pump 13 through a conduit 14 which discharges into a container 15 above the tower T. A return pipe 16 is provided and the rate of supply by the pump 13 is such that there is always a slight return flow through the conduit 16, thus insuring the maintenance of a constant level in the container 15. The container 15 is connected to spray nozzles 17 through a conduit 18 having a trap therein. A valve 19 is provided and this is operated at timed intervals in accordance with the amount of solvent it is desired to inject into the apparatus. This injecting step is preferably accomplished several times each hour and it may be readily done by an electromagnet 20 connected to any desired timed controlling means. The particular apparatus shown forms a part of the apparatus described and claimed in the co-pending application of Alfred R. Powell, Serial No. 10,529, filed February 20, 1925.

When the valve 19 is opened oil flows through the conduit 18 to the sprays 17. The oil runs down over the packing in the upper section of the tower and then mixes with the oil sprayed in the lower section of the tower. Fresh oil is supplied as required to the tank 12. It will be seen therefore that the oil supplied through the sprays 17 for the last stage of scrubbing is fresh and uncontaminated and that this oil, by reason of the intimate contact insured by the diamond hurdles and the steel spiral packing, will absorb substantially all of the naphthalene remaining in the gas being treated. The oil, however, has not yet absorbed all of the naphthalene which it is capable of taking up and it flows down through the tower and is mingled with the oil supplied through the sprays 6. The mixture then passes to the tank 4 and is re-circulated through the spray 6. An overflow pipe 21 is provided for taking off the excess which accumulates by reason of the injection of oil through the sprays 17.

On account of the vapor tension of the naphthalene dissolved in oil, there is a definite relation between the percentage of naphthalene in the oil and the amount of naphthalene in the gas in equilibrium with such oil at any given temperature. This means that when gas is brought into contact with oil containing naphthalene, the oil will either abstract the napthalene from the gas or will give naphthalene up to the gas until this equilibrium is reached. The following table shows the equilibrium conditions for kerosene, gas oil and anthracene oil at different temperatures:

| Per cent naphthalene in oil. | Kerosene—grains naphthalene per 100 cu ft. gas. | | | Gas oil—grains naphthalene per 100 cu. ft. gas. | | | Anthracene oil—grains naphthalene per 100 cu. ft. gas. | | |
|---|---|---|---|---|---|---|---|---|---|
| | 22.4° C. | 27° C. | 32° C. | 22.8° C. | 27° C. | 32° C. | 22.8° C. | 27° C. | 32° C. |
| 2 | 2.6 | 2.8 | 3.6 | 2.0 | 2.6 | 4.7 | 2.3 | 4.1 | 4.8 |
| 4 | 5.1 | 5.8 | 8.1 | 5.4 | 6.8 | 9.6 | 4.4 | 7.5 | 9.5 |
| 6 | 7.6 | 9.0 | 14.4 | 9.6 | 11.3 | 16.0 | 6.2 | 9.9 | 14.3 |
| 8 | 10.2 | 12.2 | 22.0 | 12.7 | 14.2 | 24.2 | 7.7 | 11.6 | 19.1 |

With these data, the conditions of operation of the apparatus comprised in my invention may be computed. The percentage of naphthalene in the oil in circulation in the lower section of the scrubber determines the amount of naphthalene in the gas passing from this lower section to the upper section. For example, if kerosene is used as the solvent at a temperature of 27° C. and if the kerosene be added in such amounts as to maintain approximately 8% of naphthalene in the outgoing oil, the gas in passing through the lower section of the scrubber will be reduced to approximately 12 grains of naphthalene per 100 cu. ft. and this reduction will be to a large extent independent of the amount of naphthalene present in the inlet gas provided the gas rate is not so high as to exceed the capacity of the scrubber. The percentage of naphthalene in the oil in circulation in the lower section of the scrubber is, of course, fixed in practice by the rate of addition of fresh oil to the upper section of the scrubber. As the conditions of operation require that the gas passing from the lower section to the upper section shall contain not more than 30 grains of naphthalene per 100 cubic feet, and as the rate of recirculation in the lower section must be adjusted, as has been stated, so that even distribution is obtained, it follows that there is only one point in the system to be regulated, this is the addition of fresh oil to the upper section. I have found that on account of the very efficient tower filling used much higher gas rates can be employed than in other types of apparatus.

The amount of naphthalene in the outgoing oil is of course readily calculated from the oil rate and the amount of naphthalene in the inlet gas. For example, assuming that the amount of fresh oil injected is equivalent to 100 gallons per 1,000,000 cu. ft. and that the total amount of naphthalene removed from the gas is 30 grains per 100 cu. ft.:

Grains naphthalene removed per gallon oil=

$$\frac{30 \times 10,000}{100} = 3,000.$$

This is equivalent to about 1.43 pounds per gallon, or approximately 6.6%. Under these conditions, assuming the use of kerosene at 27° C., the lower section of the tower would remove approximately 20 grains of naphthalene per 100 cu. ft., leaving 10 grains of naphthalene per 100 cu. ft. to be removed in the upper section.

It will be seen that since the amount of oil used is very small in proportion to the gas volume very little benzol or other enriching material is removed in the process of naphthalene removal and the removal of benzol may be practically eliminated by the known expedient of adding benzol to the fresh oil injected into the upper part of the tower.

I thus provide for removing naphthalene and analogous hydrocarbons from fuel gas by subjecting the gas to the action of a solvent a plurality of times, it being preferred that the gas is last subjected to fresh solvent. The provision of the metal turnings makes for exceedingly intimate contact between the solvent and the gas and insures high efficiency in the apparatus. The apparatus has a very high efficiency in proportion to its size, is inexpensive and is practically automatic in its operation. It offers very small resistance to the flow of gas so that there is a minimum loss of gas pressure in the naphthalene removal. The absorption of benzol or other enriching hydrocarbons from the gas is reduced to negligible amounts and can be even practically eliminated. The final scrubbing step is a separable operation from the earlier scrubbing step or steps and may be separated therefrom, but it is preferred to carry out the several operations in a single tower as this greatly simplifies the matter of constantly refreshing the solvent used in the earlier scrubbing steps. It will be seen from the operation of the apparatus that while the solvent supplied through the sprays 6 is impure, yet it is having constantly added thereto solvent which is only partially contaminated and coming from the final scrubbing step. Because of this the re-circulated solvent which is used in the earlier scrubbing stage or stages is kept up to a sufficient degree of purity to insure satisfactory operation.

While I have specifically described the operation of the apparatus as applied to naphthalene, it will be understood that the invention is applicable to analogous hydrocarbons and that where the term naphthalene is used in the claims it is intended therein to apply to analogous hydrocarbons. It will be also understood that, while I have referred generally to fuel gas, this term is intended to cover illuminating gas. While I have illustrated a preferred apparatus for carrying out my invention it will be understood that I am not limited to the illustrated form as the invention may be otherwise embodied or practiced within the scope of the following claims.

I claim:

1. The process of removing naphthalene from flowing fuel gas, which includes re-circulating a solvent through the flowing gas, and subjecting the same gas to substantially uncontaminated solvent after it has passed through the re-circulating stage, substantially as described.

2. The process of removing naphthalene from flowing fuel gas, which includes re-circulating a solvent through the gas, subjecting the same gas to substantially uncontaminated solvent after it has passed through the re-circulating stage, and adding the solvent used in the last-mentioned stage of operation to the solvent used in the re-circulating stage, substantially as described.

3. The process of removing naphthalene from flowing fuel gas, which includes re-circulating a solvent through the flowing gas, and subjecting the same gas to substantially uncontaminated solvent after it has passed through the recirculating stage, the solvent used in the last-mentioned stage being supplied intermittently, substantially as described.

4. The process of removing naphthalene from flowing fuel gas in a tower, which includes passing gas upwardly through the tower, introducing a relatively large quantity of solvent part way up the tower and allowing the same to travel downwardly to remove the major portion of the dissolved naphthalene, and, above the point of introduction of the first-mentioned quantity of solvent, introducing to the tower a relatively small amount of substantially uncontaminated solvent to effect a final purifying operation, substantially as described.

5. The process of removing naphthalene from fuel gas in a tower, which includes passing gas upwardly through the tower, introducing a solvent part way up the tower and allowing the same to travel downwardly to remove a portion of the naphthalene, and, above such point of introduction, introducing to the tower fresh solvent to effect further naphthalene removal, substantially as described.

6. The process of removing naphthalene from fuel gas in a tower, which includes passing gas upwardly through the tower, introducing a solvent part way up the tower and allowing the same to travel downwardly, introducing fresh solvent to the tower above the point of introduction of the first-mentioned solvent, collecting the last-mentioned solvent with the first-mentioned solvent, and supplying the mixture to the tower part way up the tower, the mixture being effective for the removal of a part of the naphthalene from the gas, and the fresh solvent being effective for further naphthalene removal, substantially as described.

7. The process of removing naphthalene from fuel gas in a tower, which includes passing gas upwardly through the tower, introducing solvent at a point part way up the tower and allowing the same to travel downwardly, substantially continuously circulating the solvent to effect a preliminary naphthalene removing operation, and supplying fresh solvent to the tower above said point of introduction to effect further removal of naphthalene from the gas, substantially as described.

8. The process of removing naphthalene from fuel gas in a tower, which includes passing gas upwardly through the tower, introducing a solvent part way up the tower and allowing the same to travel downwardly, supplying fresh solvent to the tower above such point of introduction and holding the fresh solvent in the path of the gas for a time, distributing the same over a large surface, and bringing it into intimate contact with the gas, substantially as described.

9. The process of removing naphthalene from fuel gas in a tower, which includes passing gas upwardly through the tower, introducing a solvent part way up the tower and allowing the same to travel downwardly, substantially continuously circulating such solvent, supplying fresh solvent to the tower above such point of introduction and holding the fresh solvent in the path of the gas for a time, distributing the same over a large surface, and bringing it into intimate contact with the gas, the fresh solvent being supplied intermittently, substantially as described.

10. The process of removing naphthalene from fuel gas in a tower, which includes passing gas upwardly through the tower, introducing a solvent part way up the tower and allowing the same to travel downwardly, substantially continuously circulating such solvent, supplying fresh solvent to the tower above such point of introduction and holding the fresh solvent in the path of the gas for a time, distributing the same over a large surface, bringing it into intimate contact with the gas, and collecting the fresh solvent with the first-mentioned solvent and circulating the mixture, substantially as described.

11. The process of removing naphthalene from fuel gas in a tower, which includes passing gas upwardly through the tower and supplying solvent at a plurality of points up the tower and allowing the solvent to travel downwardly therethrough, the solvent supplied near the top of the tower being substantially uncontaminated and effective for a final naphthalene removal step, the solvent supplied elsewhere being effective for a preliminary naphthalene removal step, collecting the solvent supplied near the top of the tower with the solvent supplied therebelow, and supplying the mixture below the top of the tower whereby a re-circulation of solvent is effected for the preliminary naphthalene removal step, substantially as described.

12. The process of removing naphthalene from fuel gas, which includes first reducing the naphthalene content to not more than about 30 grains per 100 cubic feet and then removing substantially all of the remaining naphthalene by substantially uncontaminated absorbent oil, substantially as described.

13. The process of removing naphthalene from fuel gas, which includes first reducing the naphthalene content to not more than about 30 grains per 100 cubic feet and then removing substantially all of the remaining naphthalene by substantially uncontaminated absorbent oil, the absorbent oil being intermittently applied, substantially as described.

14. The process of removing naphthalene from fuel gas in an absorber, which includes supplying to the absorber fuel gas containing not more than about 30 grains of naphthalene per 100 cubic feet, intermittently supplying to the absorber quantities of substantially uncontaminated solvent and distributing such solvent over a relatively large area and bringing it into intimate contact with the gas, substantially as described.

15. The process of removing naphthalene from fuel gas in a tower, which includes passing the gas upwardly through the tower, introducing a solvent part way up the tower and re-circulating the same through a portion of the tower below such point of introduction, introducing fresh solvent to the tower above said point of introduction, spreading the fresh solvent over a relatively large surface and bringing it into intimate contact with the gas and permitting such solvent to travel downwardly and mix with and renew the first-mentioned body of solvent, the fresh solvent being supplied at such a rate as to maintain the purity of the first-mentioned body of solvent up to a point which will insure that the gas passing from the lower section to the upper section of the tower shall contain not more than about 30 grains of naphthalene per 100 cubic feet, substantially as described.

16. The process of removing naphthalene from fuel gas in a tower, which includes passing the gas upwardly in a tower, introducing a solvent part way up the tower and recirculating the same through a portion of the tower below such point of introduction, supplying fresh solvent to the tower above such point of introduction, spreading the same over a large area and bringing it into intimate contact with the gas, and permitting the fresh solvent to travel downwardly to mix with and renew the first-mentioned body of solvent, the fresh solvent being supplied at such a rate as to maintain the purity of the first-mentioned body of solvent up to a point which will insure that the gas passing from the lower section to the upper section of the tower shall contain not more than about 30 grains of naphthalene per 100 cubic feet, the fresh solvent being supplied intermittently, substantially as described.

17. The process of removing naphthalene from fuel gas in an absorbent tower, which includes passing gas upwardly through the tower, substantially continuously circulating solvent through a lower portion of the tower, supplying fresh solvent to the tower above the zone of the circulated solvent, permitting the fresh solvent to travel downwardly into the zone of the circulated solvent, withdrawing from the system an amount of solvent substantially equal to the amount of fresh solvent added, and regulating the addition of fresh solvent to the tower to such amounts that the purity of the circulated solvent is maintained up to a point which will insure the supplying of fuel gas to the upper portion of the tower with a naphthalene content of not more than about 30 grains per 100 cubic feet, substantially as described.

18. The process of removing naphthalene from fuel gas in a tower, which includes passing upwardly through the tower fuel gas containing not more than about 30 grains of naphthalene per 100 cubic feet, intermittently supplying a solvent to the tower, spreading the same over a large area and bringing it into intimate contact with the gas, and permitting the solvent to travel downwardly through the tower, substantially as described.

19. The process of removing naphthalene from flowing fuel gas, which includes treating the gas with a solvent supplied at a plurality of points along the path of the gas, the oil supplied prior to the final stage being effective for reducing the naphthalene content of the gas to not more than about 30 grains per 100 cubic feet and the solvent supplied in the final stage being effective for removing substantially all the remaining naphthalene, substantially as described.

In testimony whereof I have hereunto set my hand.

FREDERICK W. SPERR, Jr.